United States Patent
Stiegler et al.

(10) Patent No.: US 6,446,685 B2
(45) Date of Patent: Sep. 10, 2002

(54) CLOSURE VALVE FOR A FLUID CONTAINER

(75) Inventors: Ottmar Stiegler, Sauerlach (DE); Raymond Paul Doherty, Coventry (GB)

(73) Assignees: Bayerische Motoren Werke Aktiengesellschaft, Munich (DE); Rover Group Limited, Warwick (DE)

( * ) Notice: Subject to any disclaimer, the term of this patent is extended or adjusted under 35 U.S.C. 154(b) by 0 days.

(21) Appl. No.: 09/803,361

(22) Filed: Mar. 12, 2001

(Under 37 CFR 1.47)

(30) Foreign Application Priority Data

Mar. 10, 2000  (GB) ............................................. 0005625

(51) Int. Cl.⁷ .................................................. B65B 1/04
(52) U.S. Cl. ............. 141/301; 220/86.2; 220/DIG. 33; 251/129.03
(58) Field of Search .................................. 141/301, 349, 141/350; 220/86.2, DIG. 33, 212.5, 253, 254, 373; 251/129.03

(56) References Cited

U.S. PATENT DOCUMENTS 5,547,099 A * 8/1996 Chang
5,901,760 A    5/1999 Parker et al. ............... 141/312
5,931,206 A * 8/1999 Simdon et al.
6,206,339 B1 * 3/2001 Parker et al.

FOREIGN PATENT DOCUMENTS

| EP | 0 342 679 | 5/1989 |
| FR | 2 625 141 | 6/1989 |
| GB | 752246 | 3/1954 |
| GB | 1 299 564 | 5/1971 |
| GB | 2 328 433 A | 2/1999 |

* cited by examiner

Primary Examiner—Steven O. Douglas
(74) Attorney, Agent, or Firm—Crowell & Moring LLP

(57) ABSTRACT

A closure valve for the filler neck of a vehicle fuel tank includes a plastic ball with a vapor impermeable plate attached to it to form part of its surface. The ball is held between a carrier on the inside and a seal carrier on the outside, the seal carrier being held against the ball by a screw cap, a spring washer and a vapor seal. When the valve is closed the plate, the seal carrier, the vapor seal and ring seals form a relatively impermeable barrier covering the end of the fuel filler pipe and preventing the escape of significant amounts of fuel vapor.

17 Claims, 5 Drawing Sheets

CLOSURE VALVE FOR A FLUID CONTAINER

BACKGROUND AND SUMMARY OF THE INVENTION

This application claims the priority of British patent document 0005625.9, filed Mar. 10, 2000, the disclosure of which is expressly incorporated by reference herein.

The present invention relates to a closure valve particularly a closure valve for a vehicle fuel filler system.

For many years it has been conventional to close the fuel filler neck of a vehicle with a simple screw or bayonet cap. However, this arrangement has certain disadvantages, one of which is that the cap can easily be mislaid when the fuel tank is being filled.

Various proposals have been made to replace the screw cap with a ball valve, for example as disclosed in U.S. Pat. No. 5,901,760 or German patent document DE 88,16 045. However, these devices still are not capable of meeting prospective requirements and legislation for ultra low emission systems.

The present invention therefore provides a closure for the neck of a container for liquid including a cap for covering the end of the neck, the cap having an aperture for receiving liquid therethrough. A ball mounted in the neck has a passage therethrough and an impermeable portion forming part of its outer surface. The ball is rotatable between a first position, in which the passage is aligned with the aperture to open the neck, and a second position, in which the impermeable portion is aligned with the aperture to close the neck.

Preferably, the ball is formed mainly from a plastic member, which may for example be molded, and the impermeable portion is formed separately from a different material and attached to the plastic member so as to form part of the ball.

The impermeable portion may form part of a plate member, which is preferably formed of metal and may be attached to the plastics member by adhesive or a snap-fit action. Alternatively, the impermeable portion could be formed as a coating on the plastics, such as chrome plating or the like. The main part of the ball can be made of a material of relatively high permeability, such as Nylon 6.

The closure preferably further includes a sealing assembly to seal between the ball and the neck. When the ball is in the closed position, the sealing member extends between the impermeable portion and the neck so that the sealing member and the impermeable portion completely seal the neck.

Preferably, when the ball is in the closed position, the impermeable portion is on the outer side of the ball.

The sealing assembly may comprise a seal carrier, a first seal acting between the seal carrier and the ball and a second seal acting between the seal carrier and the neck. In order for the seal to be effective the sealing assembly must be made of a material of relatively low permeability. For example the carrier can be made of metal, such as aluminum, or of low permeability plastics such as "acetyl", and the seals are preferably made of PTFE as this has a low permeability and low friction.

Preferably the cap is removable, so that the closure can be removed for servicing.

Preferably, when the ball is in the closed condition, the impermeable portion of its surface is approximately level with the cap and the end of the filler neck, thereby providing easy access to the filler neck.

With known ball valve systems it tan also be a problem that they are difficult to assembly and to service.

Accordingly, the present invention further provides a container for liquid having a neck through which liquid can be put into the container and a closure for closing the neck. The closure comprises a carrier which can be inserted into the neck and a ball member rotatably supported on the carrier such that it can be mounted in the carrier and inserted into the neck with the carrier. The ball member has an aperture through it such that it can be rotated in the carrier to open and close the neck. Removable retaining means are also provided, which can be attached to the neck so as to releasably retain the carrier and ball in the neck.

Preferably the container further comprises a sealing assembly which can be attached to the carrier so as to retain the ball in the carrier and inserted into the neck with the carrier and the ball.

Preferably the sealing assembly comprises a seal carrier, a first seal which seals against the neck, and a second seal which seals against the ball.

Preferably the retaining means comprises a cap having an aperture therethrough which can be aligned with the aperture through the ball to open the neck.

Preferably the neck has an aperture through which a drive mechanism can be inserted to rotate the ball in the carrier, and the carrier preferably has an aperture which can be aligned with that in the neck, so that the drive mechanism can be inserted through it to engage with the ball.

Other objects, advantages and novel features of the present invention will become apparent from the following detailed description of the invention when considered in conjunction with the accompanying drawings.

DETAILED DESCRIPTION OF THE DRAWINGS

Figure 1:
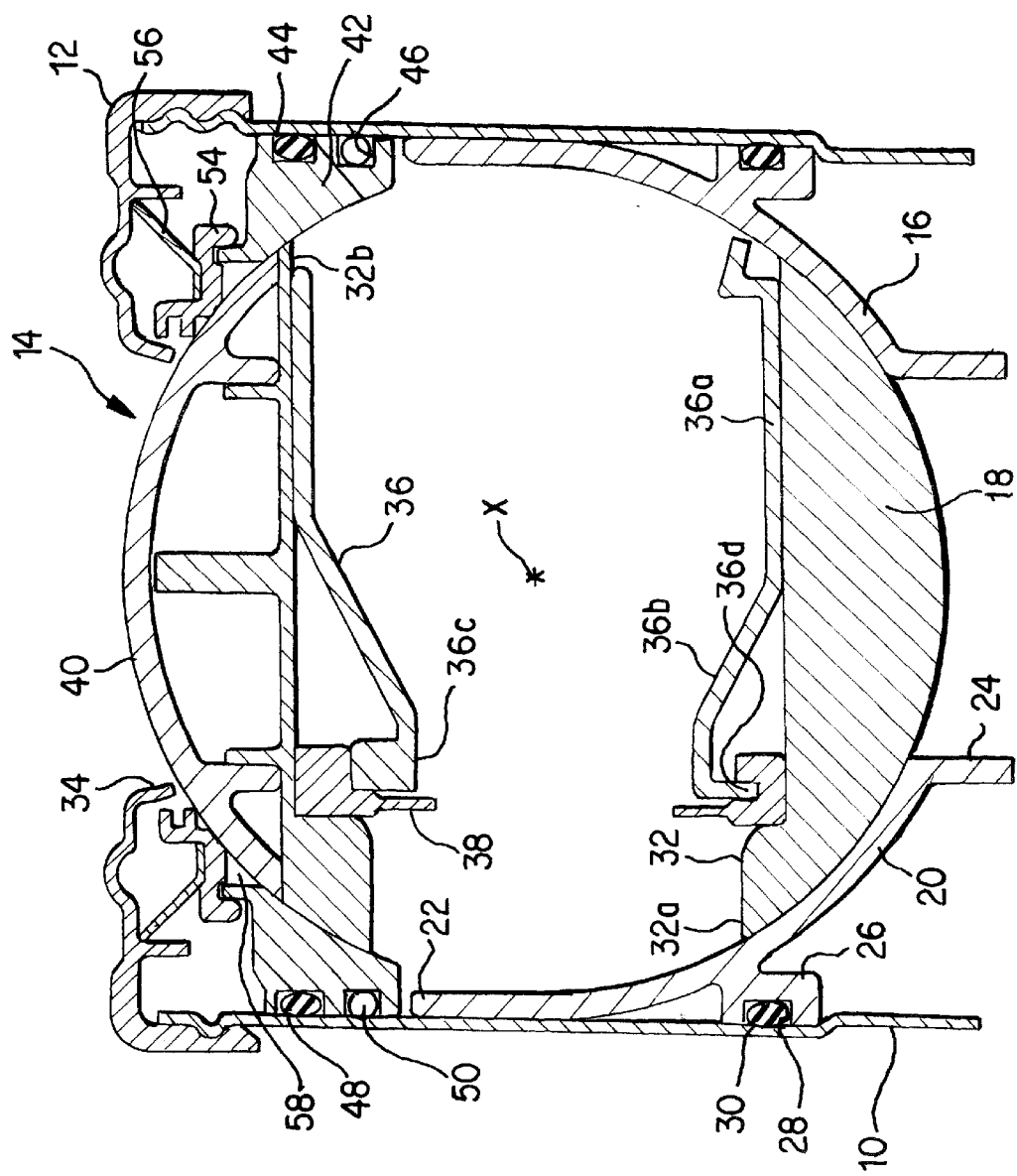
FIG. 1 is a section through a closure according to a first embodiment of the invention in a closed condition.
Figure 3:
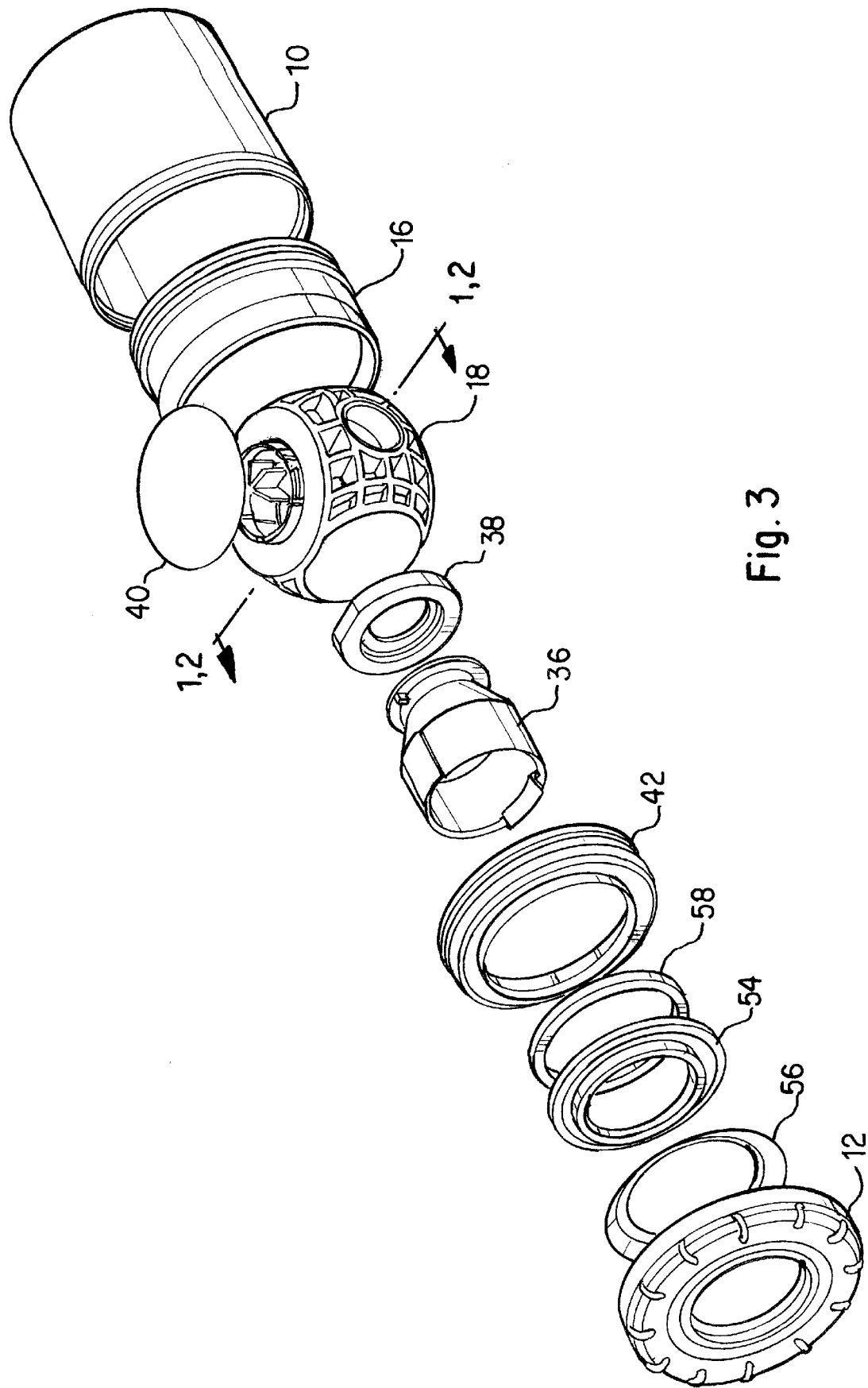
FIG. 3 is an expanded view of the closure of FIGS. 1 and 2.

Referring to FIGS. 1 and 3, in a first embodiment of the invention, a vehicle fuel tank filler pipe is formed from steel and includes at its upper end a neck portion 10 which has a screw threaded end cap 12 over its upper end and a ball valve 14 inside it just beneath the cap 12. The ball valve 14 includes a molded plastic ball carrier 16 carrying a molded plastic ball member 18. The ball carrier 16 includes a hemi-spherical bowl 20 open towards the end of the neck, with its rim 22 in contact with the inside of the neck 10 and an aperture 24 through its center. About half way between the rim 22 and the aperture 24 a flange 26 extends outwards from the outer surface of the bowl 20, the flange having a groove 28 formed in its outer surface which carries a ring seal 30. The rim of the flange 26 contacts the inner surface of the neck 10 and locates the ball carrier 16 in the neck. It also rests against a step 10a in the neck 10 to prevent the carrier 16 from sliding down the neck.

The ball member 18 is generally spherical in shape and has a passageway 32 extending centrally through it with an inner end 32a of substantially the same diameter as the aperture 24 through the ball carrier 16 and an outer end 32b of substantially the same diameter as a central aperture 34 which is provided through the cap 12. A tubular nozzle restrictor 36 is located inside the passageway 32 which has a wide portion 36a at its outer end, which fits against the inner surface of the passageway 32, and a tapered section 36b which reduces in diameter towards its inner end which defines a nozzle restricting aperture 36c with an outturned flange 36d at its end. A nozzle seal 38 fits over the flange 36d sealing the flange to the inner wall of the passageway 32, and has a lip 38a which extends radially inwards over the end of the nozzle restrictor 36 beyond the inner surface of nozzle restricting aperture 36c.

Part of the curved outer surface of the ball member 18 is formed from a metal closure plate 40. This closure plate 40 is domed or part-spherical with a round outer edge and forms an area of the ball 18 which is larger than the area of the opening 34 in the cap 12.

An annular molded plastic seal carrier 42 is located inside the filler neck 10 between the ball carrier 16 and the cap 12. It has two grooves 44, 46 in its outer surface, the one 44 nearest the cap 12 carrying a low permeation seal 48 made of PTFE and the one 46 nearest the ball carrier 16 carrying a ring seal 50. The inner surface 52 of the seal carrier 42 is tapered towards the top end of the assembly and curved so that it fits against and supports the surface of the ball 18. An annular dust seal 54 is located just under the cap 12, being of larger diameter than the aperture 34 through the cap 12. A spring washer 56 acts between the cap 12 and the dust seal 54 to hold the dust seal 54 against the surface of the ball 18. A vapor seal 58 formed from PTFE is located between the seal carrier 42 and the dust seal 54 and is held in place there by the force of the spring washer 56 acting on the dust seal 54. The diameter of the vapor seal 58 is smaller than that of the cover plate 40 so that the whole of the aperture radially inside the vapor seal 58 is closed off by the cover plate when the ball 18 is in the closed position as shown in FIG. 1.

The ball 18 is supported on a pair of trunnions in the carrier 16 so that it is rotatable about their axis X. The latter axis is perpendicular to the axis of the passageway 32 through the ball 18, and both of these axes are perpendicular to the axis passing through the center of the closure plate 40. The rotation axis X of the ball is also perpendicular to the axis of the filler pipe 10. One of the trunnions is aligned with a suitable hole in the pipe 10 so that suitable drive means can be inserted into the ball through the side of the pipe and the ball can be rotated, either by means of a motor or manually by means of a suitable lever.

Figure 2:
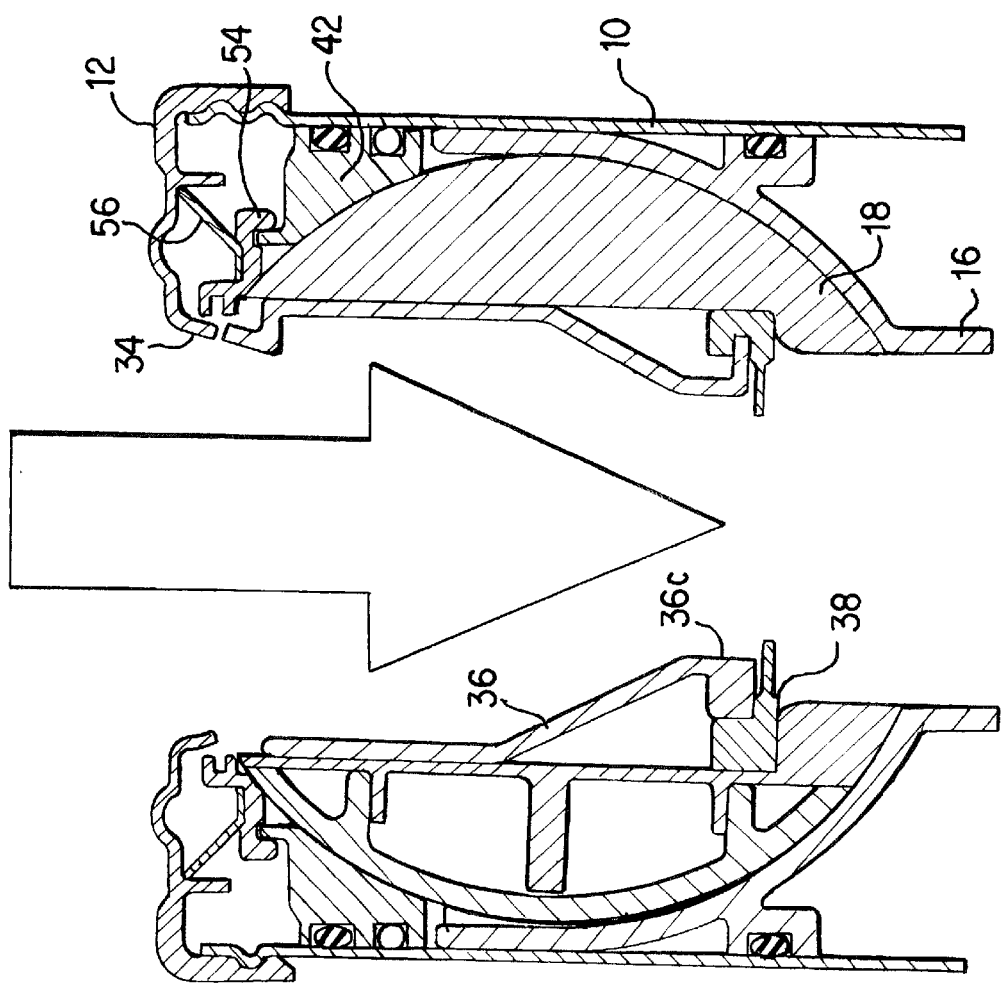
FIG. 2 is a section through the closure of FIG. 1 in an open condition.

Referring to FIG. 2, when the valve is opened by rotation of the ball 18 the passageway 32 is aligned with the opening 34 in the cap 12 and the vapor seal 58 rests against the ball 18 just outside the upper end of the nozzle restrictor 36. The fuel filler nozzle is passed down through the passageway 32 until its lower end passes through the aperture 36c at the lower end of the nozzle restrictor. There the seal 38 seals against the nozzle to prevent fuel vapor from passing back out through the passageway 32.

When the valve is closed, as shown in FIG. 1, the main impermeable sealing region of the valve is on its outer side and is formed by the sealing plate 40, the seal carrier 42 which fills the gap between the sealing plate 40 and the filler pipe neck 10, the vapor seal 58 which seals the seal carrier 42 to the sealing plate 40, and the impermeable seal 48 sealing the seal carrier 42 to the filler pipe 10. These components therefore form a substantially impermeable barrier across the end of the filler neck.

One of the main advantages of this arrangement is that it seals in any vapor coming from fuel left in the passageway 32 after filling. Another advantage of the arrangement is that, because of the screw cap 12 the whole assembly can easily be removed and placed for servicing. In order to make servicing easier the seal carrier 42 and ball carrier 16 can be arranged to lock together, for example by means of a simple snap-fit mechanism, so that the entire assembly can be lifted out of the neck as a modular unit. Also because the outer side of the ball 18 is approximately level with the top end of the filler pipe 10 and the cap 12, and therefore also with the outer body panel of the vehicle, the angle of the filler pipe can be chosen such that it is significantly away from perpendicular to the body panel without requiring a large filler pocket around the filler neck to allow access of the filler nozzle. The use of a ball valve design and its location close to the vehicle outer body panel also makes the arrangement very suitable for robotic filling stations.

Figure 4:
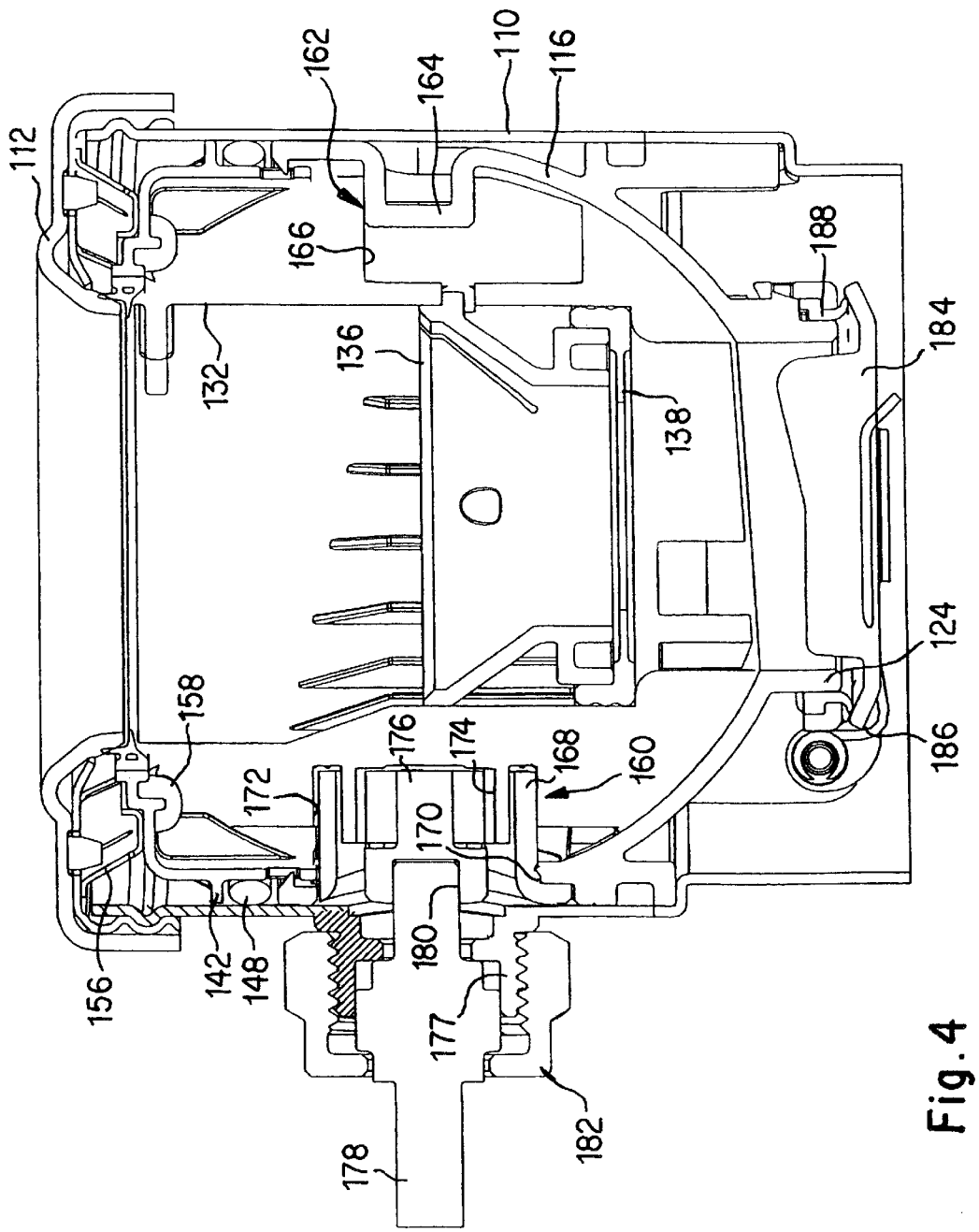
FIGS. 4 and 5 are sections through a closure according to a second embodiment of the invention.
Figure 5:
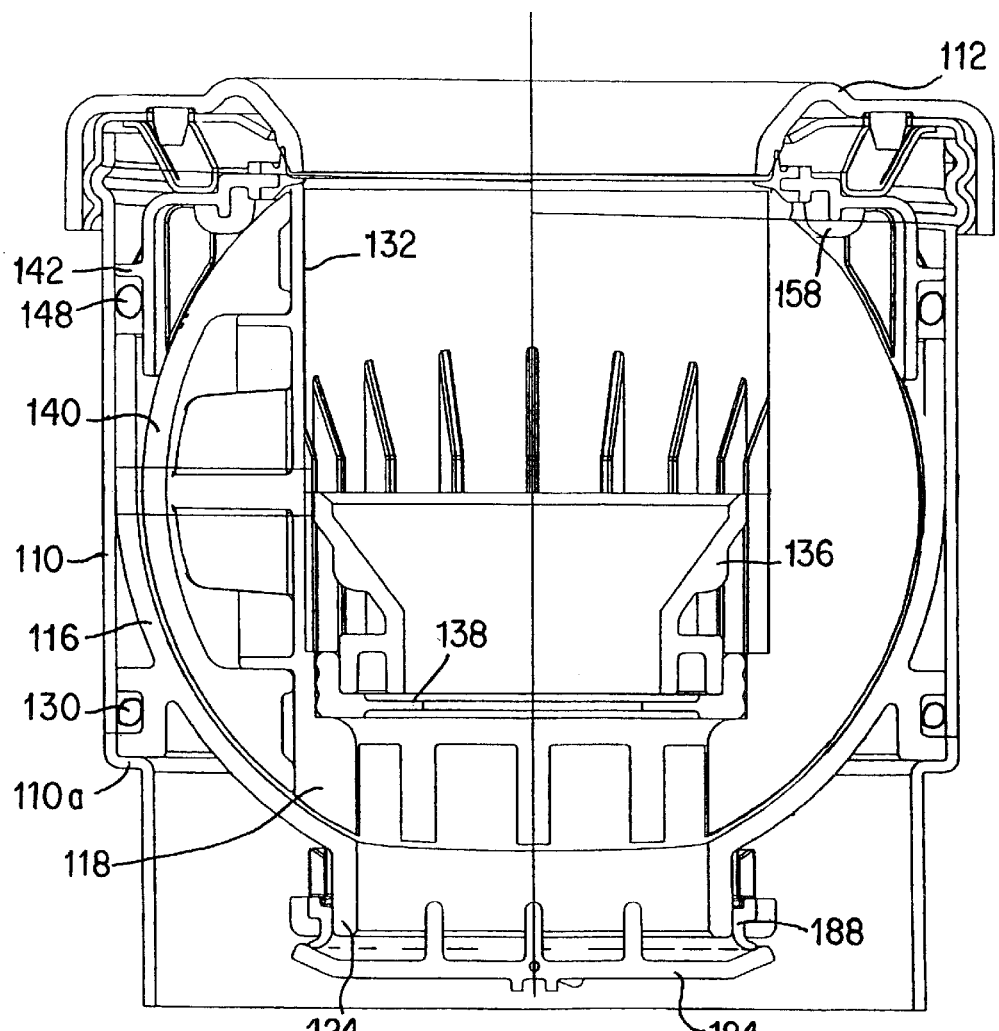

FIGS. 4 and 5 show a second embodiment of the invention, which corresponds in many ways to the embodiment of FIGS. 1 to 3; and corresponding parts are given the same reference numerals preceded by a 1. To avoid repetition only the features of the second embodiment which are different from the first embodiment will be described.

The seal carrier 142 is formed of a thinner layer of material which has the dust seal of the first embodiment integrated into it. The retaining spring 156 acts between the cap 112 and the seal carrier. The low permeability seal 158 fits over a ridge 142a on the seal carrier. There is only one ring seal 148 between the seal carrier and the filler neck 110, but this is made of rubber coated with PTFE.

FIG. 4 is a section through the trunnions 160, 162 which rotatably support the ball 118 in the ball carrier 116. One of the trunnions is formed as a simple inward projection 164 on the ball carrier 116 which extends into a corresponding socket 166 in the side of the ball 118. The other comprises a separately formed tubular trunnion member 168 which is a snap fit into an aperture 170 in the ball carrier 116 and which extends into an annular groove 172 on the ball 118. The portion of the ball 118 inside this groove 172 has an internally splined aperture 174 in it in which a splined metal drive dog 176 extends. The trunnion member 168 and drive dog 176 do not extend radially outwards beyond the outer circumference of the ball carrier 116 and can therefore be inserted into the neck with the ball carrier. A drive spindle 178 fits into a splined aperture 180 in the outer side of the drive dog 176, and is rotatably supported in an externally threaded tubular supporting portion 177 projecting from the filler neck 110. A nut 182 is screwed over the supporting portion 177 to retain the drive spindle in position. The splines interconnecting the ball 118 and drive dog 176 are relatively wide so as to distribute the loads applied to the ball 118. The mechanism for turning the drive spindle is not shown, and could for example comprise an electric motor or a manually operated lever.

FIGS. 4 and 5 also show the restrictor flap 184 covering the aperture 124 on the inside of the ball carrier 116, which is biased into a closed position by a spring 186 and sealed against the rim of the aperture 124 by means of a lip seal 118. A similar restrictor would also be used in the first embodiment although it is not shown in FIGS. 1 to 3.

In order to assemble the closure into the neck 110 the restrictor 136 and nozzle seal 138 are inserted into the ball 118 which is then placed in the carrier 116 so that it is supported on the fixed trunnion 164. The annular trunnion member 168 and drive dog 176 are then inserted into the ball 118 through the aperture 170 in the carrier, the trunnion member 168 snapping into place to retain the ball in the carrier. The seal carrier 142, with the seals 148, 158 on it, is then attached to the ball carrier. The spring 156 is preassembled onto the cap 112. The carrier 116, ball 118 and seal 142 assembly can then be inserted as a unit into the neck 110 and the cap 112 screwed on to hold the assembly in place. The drive spindle and retaining nut 182 are then screwed into place. Subsequently, if the closure unit needs to be serviced the cap 112 can be unscrewed and the drive spindle removed and the closure unit removed as a unit and repaired or replaced as necessary.

Figure 6:
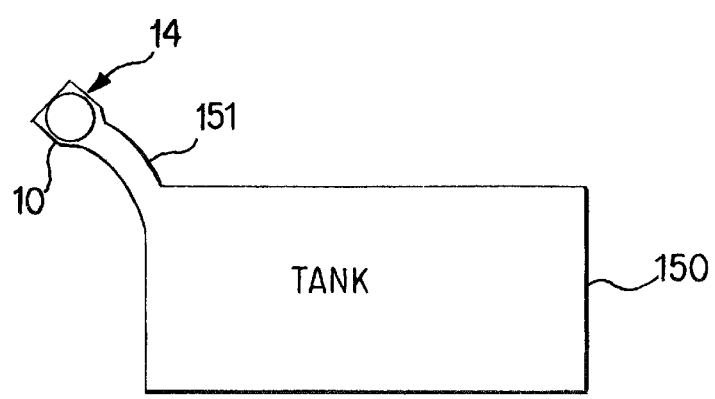
FIG. 6 shows a container for a liquid having a closure according to FIG. 1 or 4 and 5.

FIG. 6 is a schematic depiction of a container 150 for a liquid, such as a fuel tank, having a ball valve closure 14 disposed in the upper end at the neck portion 10 of a fuel tank filler pipe 151.

It will be appreciated that the modular structure of the ball valve assemblies described enables a single design of ball valve to be used in a range of vehicles. The only requirement is that the internal shape of the end of the filler necks be substantially the same. The valve can also be used with filler necks made of any suitable material, including metals such as aluminum or other non-permeable materials such as plastics.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A closure for the neck of a container for liquid, comprising:
   a cap for covering the end of the neck, the cap having an aperture for receiving liquid therethrough; and
   a ball having a body made of a first material being adapted to be mounted in the neck, and having a passage therethrough, wherein,
   the ball has a substantially impermeable portion which is made of a second material, and which forms part of an outer surface of the ball, said second material having a permeability which is less than a permeability of the first material; and
   the ball is rotatable between a first position in which the passage is aligned with the aperture to open the neck and a second position in which the substantially impermeable portion is aligned with the aperture to close the neck.

2. A closure according to claim 1, wherein:
   the ball comprises a plastic member; and
   the impermeable portion is formed separately from the ball, and is attached to the plastic member so as to form part of the ball.

3. A closure according to claim 1, wherein the substantially impermeable portion forms part of a plate member.

4. A closure according to claim 1 further comprising a sealing assembly adapted to seal between the ball and the neck when the ball is mounted in the neck, with the seal component extending between the substantially impermeable portion and the neck when the ball is in the closed position, so that the sealing component and the substantially impermeable portion completely seal the neck.

5. A closure according to claim 4, wherein when the ball is in the closed position, the substantially impermeable portion is on an outer side of the ball.

6. A closure according to claim 4, wherein the sealing assembly comprises:
   a seal carrier;
   a first seal acting between the seal carrier and the ball; and
   a second seal acting between the seal carrier and the neck.

7. A closure according to claim 5, wherein the sealing assembly comprises:
   a seal carrier;
   a first seal acting between the seal carrier and the ball; and
   a second seal acting between the seal carrier and the neck.

8. A closure according to claim 1, wherein the cap is removable.

9. A closure according to claim 1, wherein when the ball is in the closed condition the substantially impermeable portion of its surface is approximately level with the cap and the end of the neck.

10. A container for liquid having a neck through which liquid can be put into the container and a closure for closing the neck, wherein the closure comprises:
    a carrier which is adapted to be inserted into the neck;
    a ball member rotatably supported on and mountable in the carrier for insertion into the neck with the carrier;
    an aperture through the rotatably supported ball member to open and close the neck; and
    removable retaining means which are attachable to the neck so as to releasably retain the carrier and ball in the neck; wherein,
    said ball comprises a body which is made of a first material, and a substantially impermeable portion which is made of a second material, and which forms a part of an outer surface of the ball, said second material having a permeability which is less than a permeability of the first material;
    the ball is rotatable between a first position in which the passage is aligned with the aperture to open the neck and a second position in which the substantially impermeable portion is aligned with the aperture to close the neck.

11. A container according to claim 10 further comprising a sealing assembly which can be attached to the carrier so as to retain the ball in the carrier and inserted into the neck with the carrier and the ball.

12. A container according to claim 11, wherein the sealing assembly comprises:
    a seal carrier carrying a first seal which seals against the neck; and
    a second seal which seals against the ball.

13. A container according to claim 10, wherein the retaining means comprises a cap having an aperture therethrough, with which the aperture through the ball can be aligned to open the neck.

14. A container according to claim 10, wherein the neck has an aperture therethrough, through which a drive mechanism can be inserted to rotate the ball in the carrier.

15. A container according to claim 14, wherein the carrier has an aperture therethrough arranged to be aligned with the aperture in the neck, whereby the drive mechanism can be inserted through it to engage with the ball.

16. A vehicle fuel tank comprising:
    a tank body;
    a filler pipe having a neck at a distal end thereof;
    a cap for covering the end of the neck, the cap having an aperture for receiving liquid therethrough; and
    a ball having a body made of a first material being adapted to be mounted in the neck, and having a passage therethrough; wherein, the ball has a substantially impermeable portion which is made of a second material, and which forms part of an outer surface of the ball, said second material having a permeability which is less than a permeability of the first material;

the ball is rotatable between a first position in which the passage is aligned with the aperture to open the neck and a second position in which the substantially impermeable portion is aligned with the aperture to close the neck.

17. A vehicle fuel container comprising:

a neck through which liquid can flow into and out of the container; and a closure for closing the neck; wherein the closure comprises, a carrier which is adapted to be inserted into the neck;

a ball rotatably supported on and mountable in the carrier for insertion into the neck with the carrier;

an aperture through the rotatably supported ball to open and close the neck; and removable retaining means which are attachable to the neck so as to releasably retain the carrier and ball in the neck; wherein, the ball has a body made of a first material; and the ball has a substantially impermeable portion which is made of a second material, and which forms part of an outer surface of the ball, said second material having a permeability which is less than a permeability of the first material.

* * * * *